US011119289B2

United States Patent
Bullock et al.

(10) Patent No.: US 11,119,289 B2
(45) Date of Patent: Sep. 14, 2021

(54) FORMFITTING LOOSE TUBE WITH ELASTIC DEFORMATION FOR OPTIC FIBER CABLES

(71) Applicant: Sterlite Technologies Limited, Aurangabad (IN)

(72) Inventors: Steve Bullock, Parkland, FL (US); Sravan Kumar, Aurangabad (IN); Kishore Sahoo, Aurangabad (IN)

(73) Assignee: STERLITE TECHNOLOGIES LIMITED, Aurangabad (IN)

( * ) Notice: Subject to any disclaimer, the term of this patent is extended or adjusted under 35 U.S.C. 154(b) by 0 days.

(21) Appl. No.: 16/176,666

(22) Filed: Oct. 31, 2018

(65) Prior Publication Data

US 2019/0369350 A1 Dec. 5, 2019

(51) Int. Cl.
*G02B 6/44* (2006.01)
*G02B 6/38* (2006.01)

(52) U.S. Cl.
CPC ......... *G02B 6/4471* (2013.01); *G02B 6/3885* (2013.01); *G02B 6/4403* (2013.01); *G02B 6/4433* (2013.01); *G02B 6/4494* (2013.01)

(58) Field of Classification Search
CPC .. G02B 6/4471; G02B 6/3885; G02B 6/4403; G02B 6/4494; G02B 6/443; G02B 6/4411
See application file for complete search history.

(56) References Cited

U.S. PATENT DOCUMENTS

| | | | | |
|---|---|---|---|---|
| 6,321,013 | B1 * | 11/2001 | Hardwick, III | G02B 6/4411 385/109 |
| 6,400,873 | B1 * | 6/2002 | Gimblet | G02B 6/4433 385/100 |
| 2014/0199037 | A1 * | 7/2014 | Hurley | G02B 6/4403 385/114 |
| 2016/0299306 | A1 * | 10/2016 | McAlpine | G02B 6/443 |

* cited by examiner

*Primary Examiner* — Ryan A Lepisto
*Assistant Examiner* — Erin D Chiem

(57) ABSTRACT

The present disclosure provides a formfitting loose tube for optic cables. The formfitting loose tube includes a loose tube wall. The loose tube wall includes first sides, second sides, a plurality of deformation induction tabs and a plurality of fiber optics stacked together having a shape form. The plurality of deformation induction tabs includes curving sections. The curving sections intersect the first sides and the second sides at intersections. The first sides and the second sides of the loose tub wall are configured to fit the shape form of the plurality of fiber optics stacked together. The plurality of deformation induction tabs induces elastic deformation of the loose tube wall under external stress.

11 Claims, 10 Drawing Sheets

FORMFITTING LOOSE TUBE WITH ELASTIC DEFORMATION FOR OPTIC FIBER CABLES

CROSS REFERENCE TO RELATED APPLICATIONS

The present invention claims the benefit of Indian Patent Application No. 201811020793 entitled the same filed on Jun. 4, 2018, the entire contents of which are incorporated herein by reference.

BACKGROUND

The present disclosure relates to the field of optical fiber cables. More specifically, the invention relates to formfitting loose tubes with controlled elastic deformation for optic fiber cables.

In optical communication applications, water ingress, i.e. the entrance and migration of water inside of the optic fiber cable, is a major technical issue. For example, the cable placed outdoor can damage the optical fibres if the temperature drops and frozen ice is formed inside of the fiber optic cable. Depending on the method of cable constructions solving the water ingress problem, fiber optic cable are generally categorized into two types, namely dry cable and gel-filled cables. Gel-filled cables tackle the water ingress problem by filling the free space inside of the cable therein with gel-form compounds whereby substantially eliminating the free space the water can enter or migrate. Dry cables on the other hand solve the water ingress issue by including dry absorbent compounds and materials inside of the cable by absorbing the water entered into the free space. In addition, the absorbent materials in the dry cable may transform into a gel-like physical state after encountering water, thereby stopping more water from entering or migrating in the cables. The gel contained in the gel-filled cables however can be messy to handle, such as in heat stripping or splicing. In this regard, many users prefer dry cable, which requires significant less preparation and clean-up time due to the lack of gel contained there. It makes the handling of the cables more efficient and brings about cost-savings for optical communication companies.

However, the empty spaces within the dry cable cause a variety of problems. First, the more the empty space, the more water can enter. Second, where the optic fiber cables are used in long distance projects sometimes over hundreds or thousands of miles long, the cables are subject to many complicated conditions, resulting in external forces exerted to the fiber optic cables. With gel-filled cables, the gel filling up the free space within the cable provide additional protection to the optic fibers by enhancing the cable's resistance to mechanical forces such as compression, bending and twisting. The empty space in dry cables, however, will make the cable more vulnerable to those mechanical forces and easier to damage. Further, if not properly addressed in the design of the cable, external mechanical forces also greatly degrade the quality of optical communication of the optic fiber cable. Therefore, there is a need to provide dry cable with improved water blockage capability and tolerance of adverse external mechanical forces negatively affecting the performance of the optic fiber cable.

OBJECT OF THE DISCLOSURE

A primary object of the present disclosure is to provide an optic fiber cable with formfitting loose tubes that provides better performance in terms of water ingress comparing to conventional art.

Another object of the present disclosure is to provide an optic fiber cable with formfitting loose tubes providing easy field handling during bending or twisting and reducing cable kinking.

Another object of the present disclosure is to provide dry optic fiber cable with formfitting loose tubes that can use long strip in manufacturing resulting in simplification of the process.

Yet another object of the present disclosure is to provide an optic fiber cable with formfitting loose tubes rip cords that are easy to be ripped open.

SUMMARY

In an aspect, the present disclosure provides a formfitting loose tube for optic cables. The formfitting loose tube includes a loose tube wall. The loose tube wall includes first sides, second sides, a plurality of deformation induction tabs and a plurality of fiber optics stacked together having a shape form. The plurality of deformation induction tabs includes curving sections. The curving sections intersect the first sides and the second sides at intersections. The first sides and the second sides of the loose tube wall are configured to fit the shape form of the plurality of fiber optics stacked together. The plurality of deformation induction tabs induces elastic deformation of the loose tube wall under external stress.

In an embodiment of the present disclosure, the loose tube wall further includes an outside wall and an inside wall.

In an embodiment of the present disclosure, the formfitting loose tube further includes at least one rip cord positioned at a bay of the deformation induction tabs on an inside wall. The bay corresponds to a corner of the formfitting loose tube. The inside wall is curved at the corners to prevent edge fibers from touching the inner walls of formfitting loose tube. The at least one ripcord is made of Polyester/aramids threads. In addition, the at least one ripcord is coated additionally with EAA (Ethylene acrylic acid) to retain its position in the groove.

In an embodiment of the present disclosure, the plurality of deformation induction tabs has a concave shape.

In an embodiment of the present disclosure, the plurality of deformation induction tabs has a convex shape.

In an embodiment of the present disclosure, the plurality of deformation induction tabs has any other shape.

In an embodiment of the present disclosure, the plurality of deformation induction tabs is formed at corners of the loose tube wall.

In an embodiment of the present disclosure, the plurality of deformation induction tabs is formed at the second sides of the loose tube wall.

In an embodiment of the present disclosure, the plurality of fiber optics is positioned inside the formfitting loose tube in stacks of optical fiber ribbons.

In an embodiment of the present disclosure, the formfitting loose tube has a thickness in a range of about 0.5-1 millimeter.

In an embodiment of the present disclosure, the plurality of deformation induction tabs have dimensions of about 6.4 millimeter height×4.4 millimeter width when there are 12 optic fiber ribbons and each ribbon encloses 12 opticfibers.

In another aspect, the present disclosure provides a formfitting loose tube for optic cables. The formfitting loose tube includes a loose tube wall. The loose tube wall includes first sides, second sides, a plurality of deformation induction tabs, a plurality of fiber optics stacked together having a shape form and at least one ripcord positioned at a bay of the plurality of deformation induction tabs on an inside wall of the loose tube wall. The plurality of deformation induction tabs includes curving sections. The curving sections intersect the first sides and the second sides at intersections. The plurality of deformation induction tabs are one of a concave shape and a convex shape. The bay corresponds to a corner of the formfitting loose tube. The inside wall is curved at the corners to prevent edge fibres from touching the inner walls of formfitting loose tube. The at least one ripcord is made of Polyester/aramid thread. In addition, the at least one ripcord can be coated additionally with EAA (Ethylene acrylic acid) to retain its position in the groove. The first sides and the second sides of the loose tube wall are configured to fit the shape form of the plurality of fiber optics stacked together. The plurality of deformation induction tabs induces elastic deformation of the loose tube wall under external stress. The formfitting loose tube has a thickness in a range of about 0.5-1 millimeter. The plurality of deformation induction tabs has dimensions of about 6.4 millimeter height×4.4 millimeter width when there are 12 optic fiber ribbons and each ribbon encloses 12 fiber optics.

STATEMENT OF THE DISCLOSURE

The present disclosure relates to a formfitting loose tube for optic cables. The formfitting loose tube includes a loose tube wall. The loose tube wall includes first sides, second sides, a plurality of deformation induction tabs and a plurality of fiber optics stacked together having a shape form. The plurality of deformation induction tabs includes curving sections. The curving sections intersect the first sides and the second sides at intersections. The first sides and the second sides of the loose tube wall are configured to fit the shape form of the plurality of fiber optics stacked together. The plurality of deformation induction tabs induces elastic deformation of the loose tube wall under external stress.

BRIEF DESCRIPTION OF FIGURES

Figure 1:
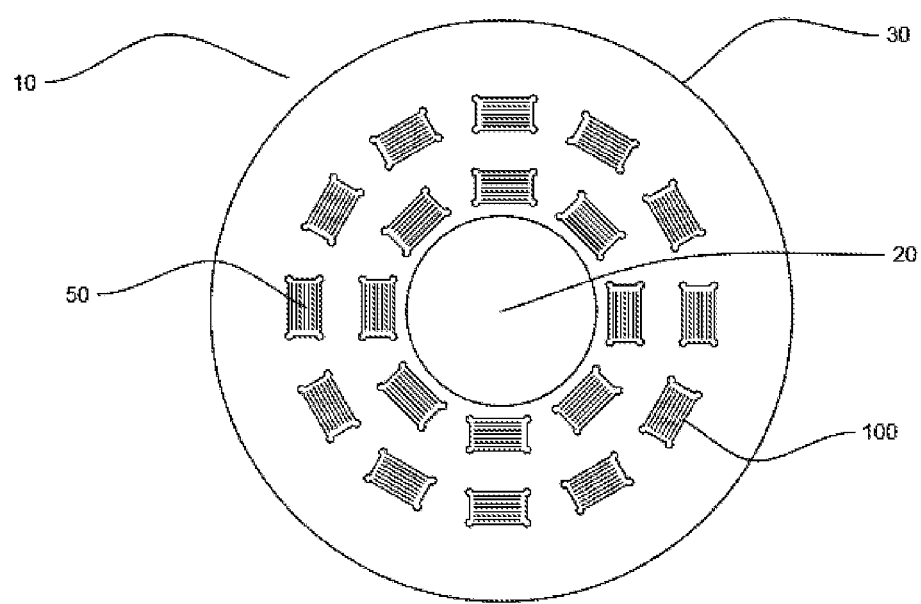
Figure 2:
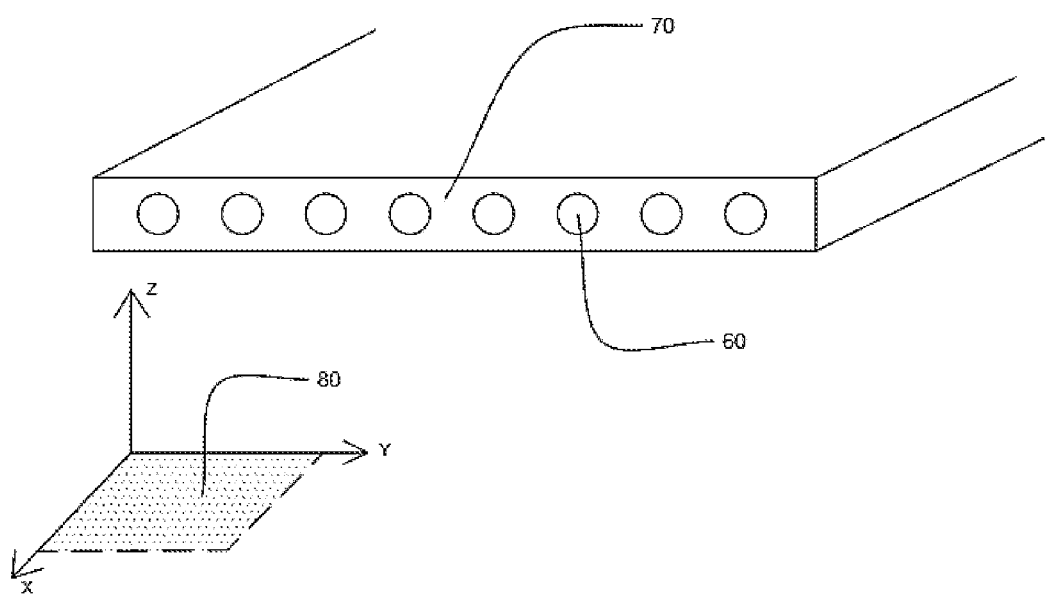
Figure 3A:
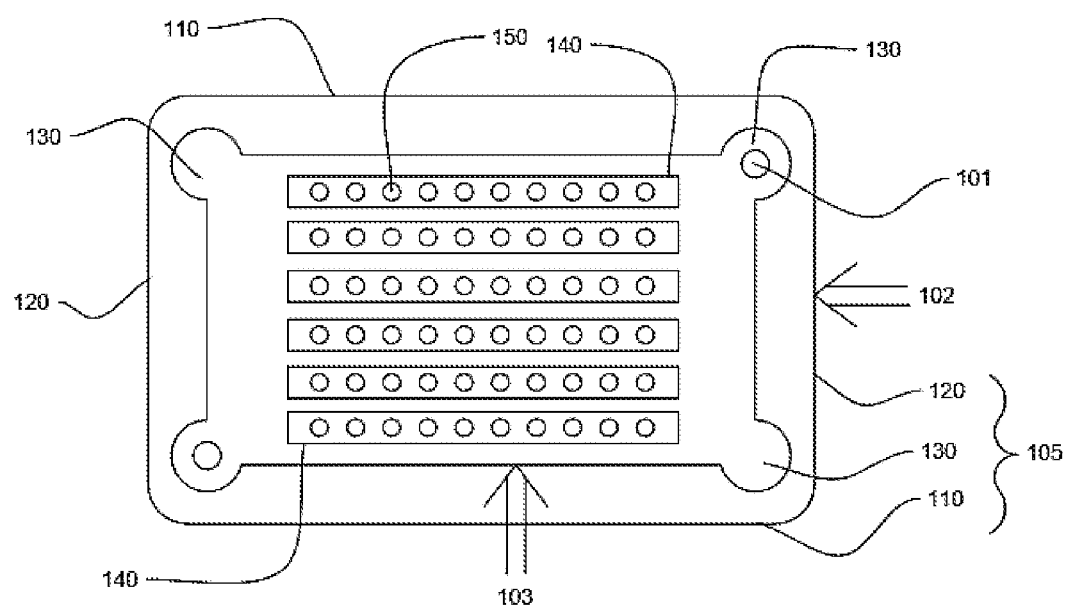
Figure 3B:
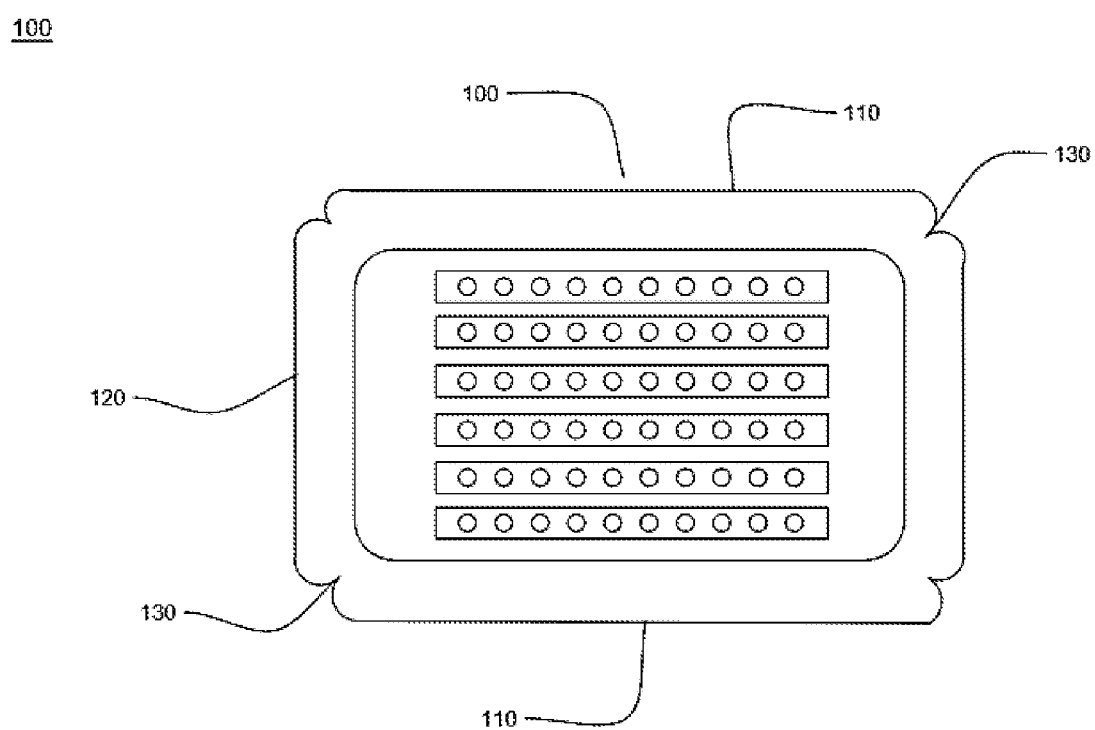
Figure 3C:
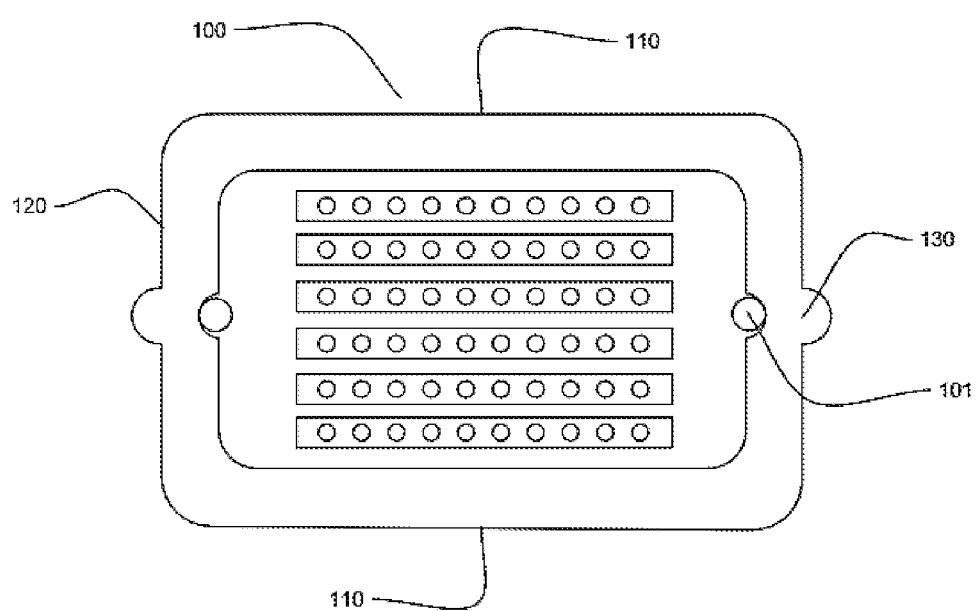
Figure 4A:
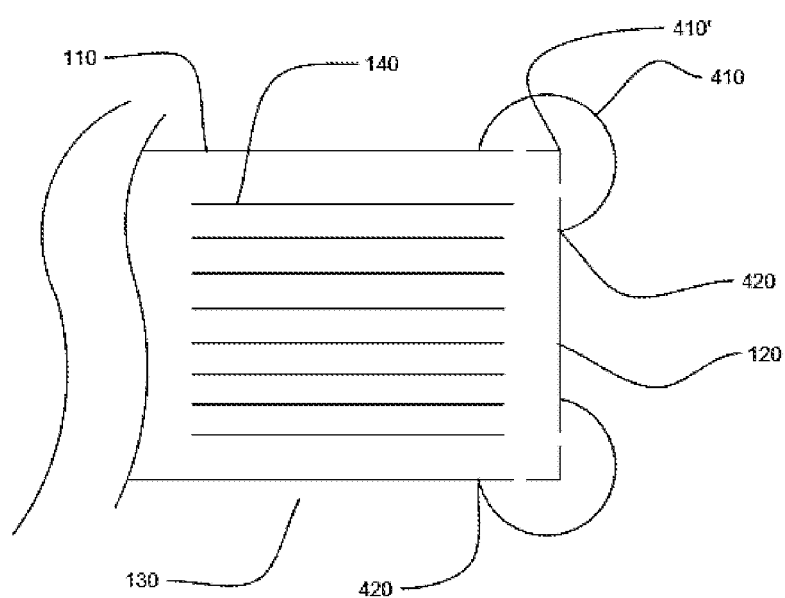
Figure 4B:
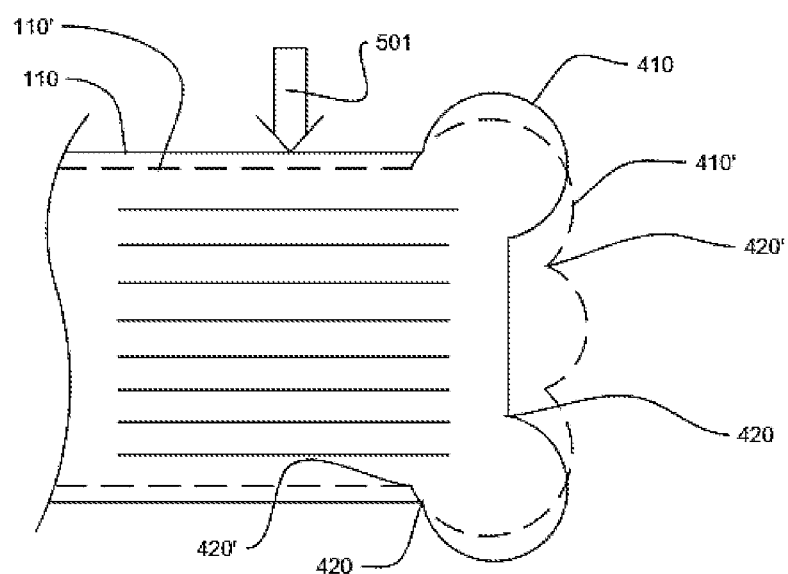
Figure 5A:
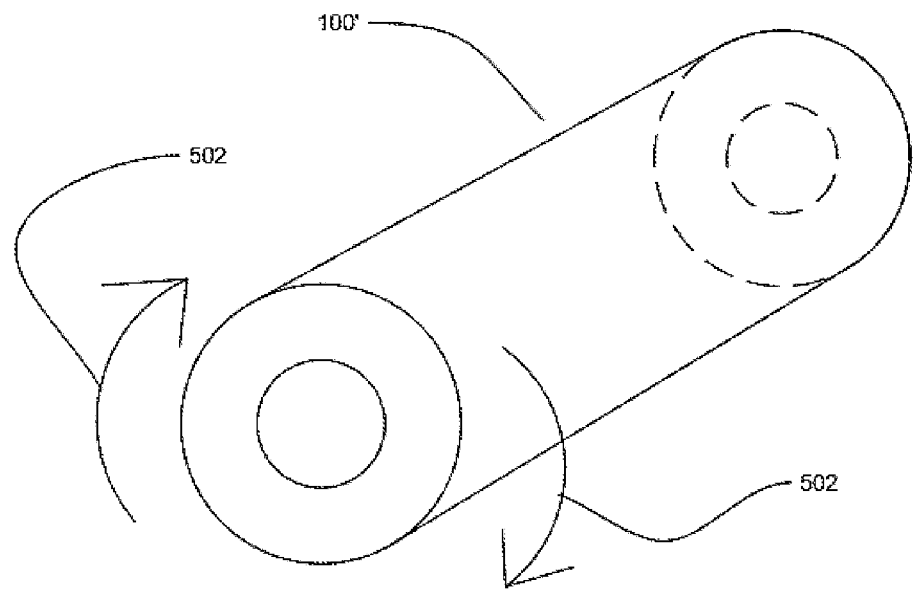
Figure 5B:
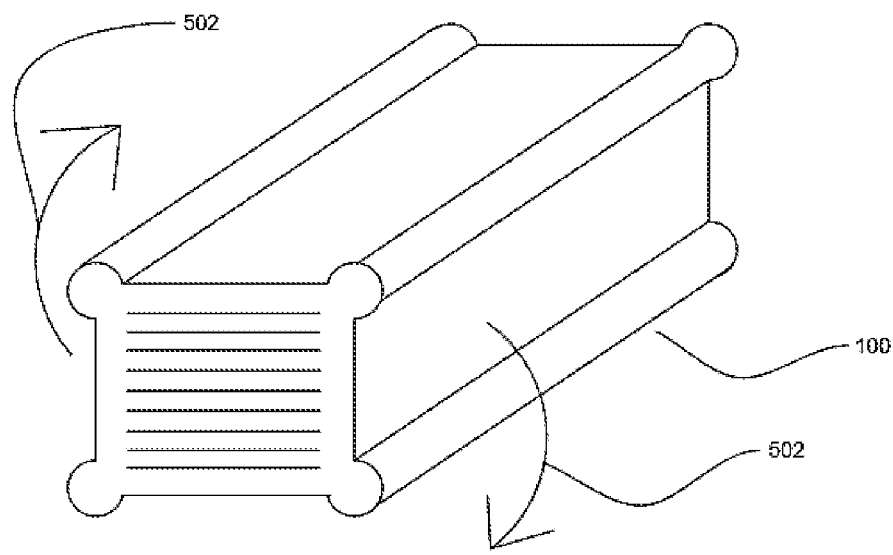

Having thus described the disclosure in general terms, reference will now be made to the accompanying figures, wherein:

FIG. 1 is a perspective view of a multi-tube optic fiber cable with formfitting loose tube according to a preferred embodiment of the present invention;

FIG. 2 (prior art) is a cross-sectional view of the optic fiber ribbon as illustrated in FIG. 1;

FIG. 3A is a cross-sectional view of the formfitting loose tube according to a preferred embodiment of the present invention;

FIG. 3B illustrates a cross-sectional view of the formfitting loose tube with concaved deformation induction tabs on the corners according to another embodiment of the present invention;

FIG. 3C illustrates a cross-sectional view of the formfitting loose tube with concaved deformation induction tabs on the stacking sides according to yet another embodiment of the present invention;

FIG. 4A is a close-up cross-sectional view of the loose tube without deformation;

FIG. 4B is a close-up cross-sectional view of the loose tube deformed under compressional stress;

FIG. 5A (prior art) illustrates the conventional loose tube under torsional stress; and FIG. 5B illustrates the formfitting loose tube under torsionall stress according to a preferred embodiment of the present invention.

Figure 5C:
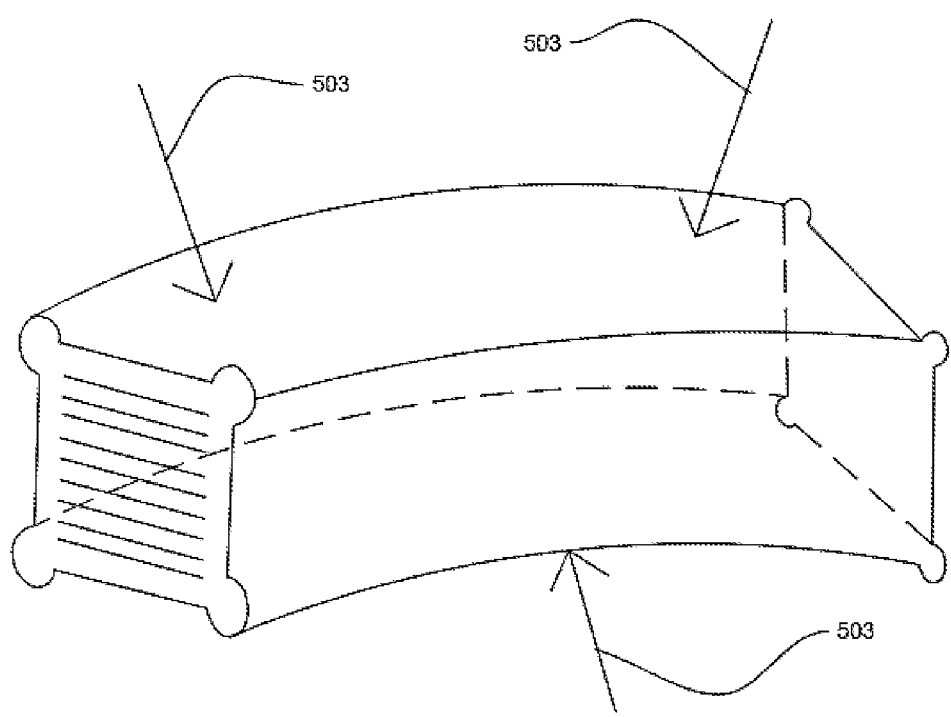

FIG. 5C illustrates the formfitting loose tube under bending stress according to a preferred embodiment of the present invention.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to select embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 is a perspective view of a multi-tube fiber optic cable 10 with formfitting loose tube, according to a preferred embodiment of the present invention. Referring to FIG. 1, the multi-tube fiber optic cable 10 comprises a central strength member 20, a cable jacket 30 and a plurality of formfitting loose tubes 100. Each of the formfitting loose tubes 100 contains a plurality of optic fiber ribbons 50 stacked in blocks. In an embodiment of the present disclosure, the fiber optic cable 10 has a diameter of about 32 millimeter for a fiber Count of 1728F where F represents fibers. In an embodiment of the present disclosure, the fiber optic cable 10 has a weight of about 520 kilogram per kilometer. In an embodiment of the present disclosure, the central strength member 20 is made of fiber reinforced plastic (FRP). In an embodiment of the present disclosure, the central strength member 20 has a diameter in a range of about 5.5-6 millimeter. In an embodiment of the present disclosure, the cable jacket 30 is made of a material selected from a group of polyethylene (MDPE/DPE) or polypropylene or low smoke zero halogen. In an embodiment of the present disclosure, the fiber optic cable 10 has a tensile strength of about 3000 Newton.

FIG. 2 (prior art) is a cross-sectional view of the optic fiber ribbon 50 as illustrated in FIG. 1. Referring to FIG. 2, optic fiber ribbon 50 comprises a type of optic a ribbon matrix 70 and a plurality of optic fibers 60 disposed in the ribbon matrix 70. The ribbon matrix 70 provides protection to the optic fibers 60 therein. The optic fibers 60 in the ribbon are spaced evenly in parallel on a common plane 80 along the longitude axis X of the ribbon. Optic fiber ribbons are preferred by in many applications. The ribbon matrix 70 provides structural support and geometrical guide by precisely placing the optic fibers evenly in the ribbon matrix 70. The number of the optic fibers of a ribbon may vary, which is usually a number of power of 2, such as 4, 8 or more.

When used in optic fiber cables, a plurality of ribbons may be stacked on top of each other's common planes and are placed in loose tubes, providing high fiber density.

The advantages of the ribbon include high density of the fiber counts per unit space, good fiber organization and management for cables carrying a lot of fibers together simultaneously and the efficiency in stripping and splicing the fibers at access points. Therefore, the optic fiber ribbons are commonly used in optical communications. Although other optic fiber devices may be used in the present invention, according to a preferred embodiment the fiber optics device used for optical communication of the present invention is fiber optic ribbon.

Referring back to FIG. 1, the formfitting loose tubes are arranged in layers of concentric circles between the central strength member 20 and the cable jacket 30. It is understood by people of ordinary skill of the art that the number of layers of the formfitting loose tubes 100 can be one layer or multiple layers. Further, the fiber optic cable 10 can be of a unitube construction (not shown). In a unitube construction, the fiber optic cable has one form-fitting loose tube, whereas the central strength member 40 may be replaced by embedded strength members not in the center of the cable. It is understood by people of the ordinary skill of the art that the unitube cable formfitting loose tube is also within the scope of the present invention.

FIG. 3A is a cross-sectional view of the formfitting loose tube 100 according to a preferred embodiment of the present invention. Referring to FIG. 3A, the formfitting loose tube 100 comprises a loose tube wall 105 and a plurality of optic fiber cables 140. The loose tube wall 105 further comprises common-plane sides 110, stacking sides 120 and deformation induction tabs 130. The common-plane sides 110 correspond to the first sides and the stacking sides 120 corresponds to the second sides of the loose tube wall 105. The loose tube wall 105 has two sides: the outside wall 102 and the inside wall 103. In addition, the outside wall 102 includes the common-plane sides 110 and the stacking sides 120. Further, the inside wall 103 includes the deformation induction tabs 130.

Inside of the formfitting loose tube 100, a plurality of ribbons 140 each containing a plurality of optic fibers 150 are stacked on top of each other's common plane therein. The common-plane sides 110 are the sides of the formfitting loose tube 100 that are parallel to the common planes of the fiber optic ribbons 140. The stacking sides 120 are the sides of the formfitting loose tube 100 that are parallel to the stacking sides of the fiber optic ribbons 140. The plurality of deformation induction tabs 130 are located on the corners between the common-plane sides 110 and stacking sides 120 according to an embodiment of the present invention. 3A, except for the deformation induction tabs 130, the formfitting loose tube 100 generally has a rectangular cross-sectional shape. The formfitting loose tubes are improved over convention cross-sectionally circular loose tubes and are form fittingly shaped to adapt to the rectangular contour of the stacked optic fiber ribbons 140.

Conventional loose tubes generally have a circular cross-sectional shape. When using the convention loose tubes with the stacked ribbons, in order to fit the cross-sectionally rectangular shaped stacked ribbons, the diameter of the conventional loose tube must be bigger than the diagonal length of the stacked ribbons. In other words, the dimension of the conventional loose tubes must be big enough to be the circumscribed circle of the rectangle contour of the stacked ribbons, resulting in segments of empty spaces between the inner of the tube and the outside contour of the stacked ribbons. Those segments of empty spaces cannot be eliminated geometrically in order to fit the rectangular stacked ribbons to the conventional loose tube. Those empty spaces increase the chance for water ingress. The formfitting shape of the loose tube 100 of the present invention reduces the chance for water ingress by eliminating the empty spaces of the conventional loose tube fitted with ribbons.

In an embodiment of the present disclosure, the shape of the plurality of deformation induction tabs 130 changes under application of stress or strain. Further referring to FIG. 3A, the deformation induction tabs 130 are convexed portions on all corners of the formfitting loose tube 100. When the formfitting loose tube 100 is under compressional stress exerted on one or more side of its surface, such as the common-plane sides 110 or the first sides 110, the deformation induction tabs 130 will be activated to elastically deform, causing the stacking side 120 to move away from the center of the loose tube 100. As such, the compressional stress that would be otherwise received by the ribbons 140 are diverted by the deformation of the induction tabs 130. According to a preferred embodiment of the present invention, the deformation induction tabs 130 are elastically deformed under working condition and will return to their original positions as shown in FIG. 3A when the external stress is withdrawn.

According to an embodiment of the present invention at least one rip cord 101 is located at the bay of the deformation induction tabs 130 on the inside wall 103. The bay corresponds to a corner of the formfitting loose tube 100. As illustrated in FIG. 3A, two rip cords 101 are located at two diagonally crossed deformation induction tabs 130. As it can be understood by people of the ordinary skill of the art, the rip cords located at the corners of the formfitting loose tube cable make it easier to rip open in field applications comparing to conventional loose tubes with cross-sectionally circular shape. The user of the loose tube of the present invention only need to pull the cords in a generally outward direction, as the rip cords will tend to be locked in its corner position, whereas in a cylindrical tube, due to the geometrically continuous curving of the inside wall, the rip cords receiving imprecise ripping forces containing side-way components, they will tend to slide to the side making the ripping process irritably inconvenient for the users.

The deformation induction tabs 130 can be located other points on the peripheral of the loose tube 100 and can be convexed or concaved. FIG. 3B illustrates a cross-sectional view of the formfitting loose tube 100 with concaved deformation induction tabs 130 on the corners according to another embodiment of the present invention. As illustrated by FIG. 3B, the deformation induction tabs 130 are concaved from the outside walls, providing a "dipping" shape on all the corners of the loose tube 100. FIG. 3C illustrates a cross-sectional view of the formfitting loose tube 100 with concaved deformation induction tabs 130 on the stacking sides 120 according to yet another embodiment of the present invention. Further illustrated in FIG. 3C are two rip cords 101 located at the bays of the deformation induction tabs 130, providing handling convenience for field application comparing to convention cylindrical loose tubes, as explained above in connection with the rip cords 101 in FIG. 3A. It shall be understood by people of ordinary skill of the art that the deformation induction tabs 130 can be located at any point of the peripheral of the loose tube 110 and can be of any one of a convexed, concaved or other shapes. Any of such designs are within the scope of the present invention.

FIG. 4A is a close-up cross-sectional view 400 of the loose tube without deformation, in accordance with an embodiment of the present disclosure. Referring to FIG. 4A, the deformation induction tab 130 comprises a curving sections 410. The curving sections 410 intersect with the sides 110 and 120 of the loose tube on intersections 420. Interposed therein with dotted lines is the natural rectangular corner 410' if the deformation induction tab 130 is not included. Comparing corners 410 to 410', it is clear that the deformation induction tabs 130 increase the length of the conventional art corners, providing the needed additional corner length for deformation.

FIG. 4B is a close-up cross-sectional view 402 of the loose tube deformed under compressional stress, in accordance with an embodiment of the present disclosure. As one or both of the common-sides 110 receives compressional stress 501, the deformation induction tabs 130 are activated and start to deform. During the deformation, the intersection points 420 on the stacking sides 120 starts to be pushed out, resulting in the entire stacking side 120 being moved away from the center of the loose tube 100. Interposed therein in FIG. 4B, the dotted lines illustrate the positions of corresponding components of the loose tube after deformation. Comparing the positions of the original curving section 410, intersection 420, and sides 110 and 120 to the corresponding deformed curving section 410', intersection 420' and sides 110' and 120', it can be appreciated that the deformation induction tab 130 diverts the compressional stress 501 that would be otherwise received by the ribbons 140, preventing or reducing micro ribbon deformation that affects the performance of the fibers, such as caused by Polarization Mode Dispersion, or PMD, as will be further explained below.

Light carrying optical information and propagating in optical fibers is polarized along the orthogonal X- and the Y-axes. The optic fibers ideally shall have perfect circular cross-sectional shape in order to make sure the X- and Y-polarized lights travel at the same speed in the fiber. When the optic fiber is not perfectly circular cross-sectionally, the problem of PMD will occur, which causes the distortion of the optical pulse carrying the optical information. PMD degenerates the quality of the optical communication, resulting in bit errors at the receiving end of the optical communication. External stresses that tend to deform the perfect circular cross-section shape will cause PMD. As illustrates in FIG. 4B, the compressional stress 501 is a form of external stress that causes PMD. As such, it can be appreciated that the present invention enhances the performance of the optic cables by reducing or preventing PMD.

According to the preferred embodiment of the invention, the deformation of the loose tube is an elastic deformation. That is, when the compressional stress 501 is withdrawn or disappeared, all deformed parts of the tube will substantially move back to their original positions. The elasticity of the deformation allows the formfitting loose tube or a part thereof only temporarily deforms when under pressure. The un-deformed form of the loose tubes is the preferred. It is understood by people of ordinary skill of the art that all materials can be permanently deformed if the pressure is big enough and different materials have different elasticity range. Nevertheless, in cable applications, users can estimate the typical pressure the cables might be subject to based on surveys and engineering processes, and choose the loose tube jacket material suitable for the particular application.

In connection with the descriptions of FIG. 4A-4B, it was explained how the present invention prevents or reduces PMD cause by compressional stress. Other external stresses that may cause PMD include bending and twisting. FIGS. 5A-5C illustrate the formfitting loose cable other forms of stresses according to a preferred embodiment of the present invention.

FIG. 5A (prior art) illustrates the conventional loose tube 100' under torsional stress. Referring to FIG. 5A, when conventional loose tube 100' with a circular cross-sectional shape receives torsional stress 502, the conventional loose tube 100' will tend to twist. Depending on the material of the jacket, the jacket might generate torque forces resisting the twist. Nevertheless, the circular cross-sectional shape of the conventional loose tube does not provide additional resistance to torsional force due to that circles are geometrically isotropic.

FIG. 5B illustrates the formfitting loose tube 100 under torsional stress according to a preferred embodiment of the present invention. Referring to FIG. 5B, when the formfitting loose tube 100 with a rectangular cross-sectional shape receives torsional stress 502 as illustrated in FIG. 5A, the formfitting loose tube 100 will have an additional tendency to rest on the cross-sectionally length side of the tube. As the ratio of the length and width sides increase, the length sides will increasingly become a preferred side for the formfitting loose tube 100 to rest on, providing additional resistance to twisting compared to convention loose tubes.

FIG. 5C illustrates the formfitting loose tube 100 under bending stress according to a preferred embodiment of the present invention. Referring to FIG. 5C, when the formfitting loose tube 100 with a rectangular cross-sectional shape receives bending stresses 503, the formfitting loose tube will also have a tendency to rest on the cross-sectionally length side of the tube. As also explained in connection with FIG. 5B, when the ratio of the length and width sides increase, the length sides will increasingly become a preferred side for the formfitting loose tube 100 to rest on. At the same time, the deformation induction tabs 130 on the formfitting loose tube may also be activated, providing the protection to the optic fibers contained therein as described in connection with compressional stresses 501 above. On the other hand, when conventional loose tubes or cables are under bending stresses, the loose tubes are susceptible to kinking breaking the continuity of the loose tube with sharp angles. Kinking is especially harmful to the fiber optic cables. In this regard, the present invention also provides a solution to the kinking problem among other advantages of the present invention.

It is also understood by people of the ordinary skill of the art that the formfitting loose tubes according to the present invention also simplifies the manufacturing process as dry-fillers for the dry cable can be long-stripped, providing cost savings for the loose tube manufacturer.

The foregoing descriptions of specified embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A formfitting loose tube for optic cables, comprising:
a loose tube wall, comprising:
   first sides;
   second sides;
   a plurality of deformation induction tabs comprising curving sections, wherein the curving sections intersect the first sides and the second sides at intersections; and
   an inside wall, wherein the plurality of deformation induction tabs are on corners of the inside wall; and
a plurality of fiber optics stacked together having a shape form,
   wherein the first sides and the second sides of the loose tube wall are configured to fit the shape form of the plurality of fiber optics stacked together,
   wherein a shape of corners of the stack of the plurality of fiber optics is different from the curving sections of the plurality of deformation induction tabs, and
   wherein a space between inside of the plurality of deformation induction tabs and the corners of the stack of the plurality of fiber optics results in minimum stress on the formfitting loose tube.

2. The formfitting loose tube as claimed in claim 1, wherein the loose tube wall further comprises an outside wall.

3. The formfitting loose tube as claimed in claim 1 further comprising at least one rip cord positioned at a bay of the deformation induction tabs on the inside wall, wherein the bay corresponds to a corner of the formfitting loose tube, wherein the inside wall is curved at the corners to prevent edge fibers from touching the inner walls of formfitting loose tube, wherein the at least one ripcord is made of Polyester/aramids threads, wherein the at least one ripcord is coated additionally with EAA (Ethylene acrylic acid) to retain its position in the groove.

4. The formfitting loose tube as claimed in claim 1, wherein the plurality of deformation induction tabs are one of a concave shape or a convex shape.

5. The formfitting loose tube as claimed in claim 1, wherein a shape of the plurality of deformation induction tabs changes under application of stress or strain.

6. The formfitting loose tube as claimed in claim 1, wherein the plurality of deformation induction tabs are formed at corners of the loose tube wall.

7. The formfitting loose tube as claimed in claim 1, wherein the plurality of deformation induction tabs are formed at the second sides of the loose tube wall.

8. The formfitting loose tube as claimed in claim 1, wherein the plurality of fiber optics are positioned inside the formfitting loose tube.

9. The formfitting loose tube as claimed in claim 1, wherein the formfitting loose tube has a thickness in a range of about 0.5-1 millimeter.

10. The formfitting loose tube as claimed in claim 1, wherein the plurality of deformation induction tabs has dimensions of about 6.4-millimeter height×4.4-millimeter width when there are 12 optic fiber ribbons and each optic fiber ribbon encloses 12 fiber optics.

11. A formfitting loose tube for optic cables, comprising:
a loose tube wall comprising:
   first sides;
   second sides;
   a plurality of deformation induction tabs comprising curving sections, wherein the curving sections intersect the first sides and the second sides at intersections; and
   an inside wall, wherein the plurality of deformation induction tabs are on corners of the inside wall, wherein the plurality of deformation induction tabs are one of a concave shape and a convex shape;
a plurality of fiber optics stacked together having a shape form,
   wherein a shape of corners of the stack of the plurality of fiber optics is different from the curving sections of the plurality of deformation induction tabs, and
   wherein a space between inside of the plurality of deformation induction tabs and the corners of the stack of the plurality of fiber optics results in minimum stress on the formfitting loose tube; and
at least one rip cord positioned at a bay of the deformation induction tabs on the inside wall, wherein the bay corresponds to a corner of the formfitting loose tube, wherein the inside wall is curved at the corners to prevent edge fibers from touching the inner walls of formfitting loose tube, wherein the at least one ripcord is made of Polyester/aramid threads, wherein the at least one ripcord is coated additionally with EAA (Ethylene acrylic acid) to retain its position in the groove wherein the first sides and the second sides of the loose tube wall are configured to fit the shape form of the plurality of fiber optics stacked together,
   wherein the formfitting loose tube has a thickness in a range of about 0.5-1 millimeter,
   wherein the plurality of deformation induction tabs have dimensions of about 6.4-millimeter height×4.4-millimeter width when there are 12 optic fiber ribbons and each ribbon enclosed 12 optic fibers.

* * * * *